United States Patent
Tung

(10) Patent No.: US 6,243,709 B1
(45) Date of Patent: Jun. 5, 2001

(54) METHOD AND APPARATUS FOR LOADING STORED PROCEDURES IN A DATABASE CORRESPONDING TO OBJECT-ORIENTED DATA DEPENDENCIES

(75) Inventor: Tony Chun Tung, Fremont, CA (US)

(73) Assignees: Sun Microsystems, Inc., Palo Alto, CA (US); Baan Development, B.V. (NL)

( * ) Notice: Subject to any disclaimer, the term of this patent is extended or adjusted under 35 U.S.C. 154(b) by 0 days.

(21) Appl. No.: 09/106,190

(22) Filed: Jun. 29, 1998

(51) Int. Cl.$^7$ ........................................................ G06F 17/30
(52) U.S. Cl. ........................ 707/103; 707/1; 707/10; 707/101; 707/102; 707/203
(58) Field of Search ........................ 707/1, 10, 101, 707/102, 103, 203; 709/331; 706/55; 712/2, 5, 9; 711/11; 715/5; 717/4, 14; 713/1, 2

(56) References Cited

U.S. PATENT DOCUMENTS

| | | | |
|---|---|---|---|
| 5,291,583 | 3/1994 | Bapat | 717/5 |
| 5,499,371 | 3/1996 | Henninger et al. | 717/2 |
| 5,596,746 | 1/1997 | Shen et al. | 707/101 |
| 5,615,362 | 3/1997 | Jensen et al. | 707/103 |
| 5,706,506 | 1/1998 | Jensen et al. | 707/103 |
| 5,812,134 | 9/1998 | Pooser et al. | 345/356 |
| 5,857,197 | 1/1999 | Mullins | 707/103 |
| 6,049,673 | * 4/2000 | McComb et al. | 717/11 |

FOREIGN PATENT DOCUMENTS

| | | |
|---|---|---|
| 0 472 812 A1 | 2/1991 | (DE) . |
| WO 95/04960 | 2/1995 | (WO) . |
| WO 95/03586 | 2/1995 | (WO) . |
| WO 97/03406 | 1/1997 | (WO) . |

OTHER PUBLICATIONS http://www.dbmsmag.com/9806d13.html, "Java in the Database Server", by Nelson King, pp. 1–8, Jun. 1998.*
IEEE publication, "Using Java to add "Stored Procedures"to Databases", by Raimund Ege et al, pp. 322–331(NASA grant and the State of Florida), Aug. 1999.*

(List continued on next page.)

Primary Examiner—Thomas Black
Assistant Examiner—Diane D. Mizrahi
(74) Attorney, Agent, or Firm—Finnegan, Henderson, Farabow, Garrett and Dunner, L.L.P.

(57) ABSTRACT

An improved object-database mapping tool is provided that stores a series of stored procedures associated with a database and an object-oriented application. The tool accesses stored procedures associated with classes corresponding to an object-oriented application. The tool determines a sequence of the stored procedures based on relationships between the classes. The tool loads the stored procedures based upon the sequence. In another aspect of the present invention, the tool uses several steps to sequence the stored procedures. The tool categorizes the stored procedures based on the classes the stored procedures correspond to in the object-oriented application. The tool loads the stored procedures corresponding to classes having relationships to other classes. The tool loads the stored procedures corresponding to classes categorized as superclasses. The tool also loads the stored procedures corresponding to classes categorized as subclasses.

19 Claims, 13 Drawing Sheets

OTHER PUBLICATIONS

IBM Technical Disclosure Bulletin, "Fast and Secure Stored Procedures for a Client/Server DBMS", vol. 38, No. 1, pp. 79–82, Jan. 1995.*

Sun Microsystems, "Java Blend Tutorial" by Java Software Division, pp. i–iv and pp. 1–76, Jun. 1998.*

IEEE publication, "Towards A Quantitative Assessment of Method Replacement", by Rudolf K. Keller et al, pp. 141–150, Feb. 2000.*

Arnold and Gosling, "The Java™ Programming Language," Addison–Wesley 1996 pp. 1–442.

"The Enterprise Objects Framework," Enterprise Objects Framework: Building Reusable Business Objects, Jul. 1994, pp. 1–13.

T. Lindholm and F. Yellin, "The Java Virtual Machine Specification" Second Edition, Apr. 1999, pp. 1–473.

"Customizable Four Pane Layout for Database Table Definition," Dec. 1992, pp. 268–269.

H. Bank, "OQL," Sep. 15, 1997 (Rev. 0.11), pp. 1–7.

"Applications in Java and Extended Java," Sep. 28, 1998, pp. 1–21.

"Sun Simplifies Database Programming with Java Blend," Aug. 21, 1997, pp. 1–3.

S. Wang, "Improvement of Concurrency Control Within Object–Oriented Database Systems," Apr. 5, 1990, IEEE, pp. 68–70.

S. Heiler and S. Zdonik, "Object Views: Extending the Vision," 1990 IEEE, pp. 86–93.

D. Agrawal, A. Bernstein, P. Gupta, and S. Sengupta, "Distributed Multi–Version Optimistic Concurrency Control for Relational Database," Mar. 1986, pp. 416–421.

X. Qian and L. Raschid, "Query Interoperation Among Object–Oriented and Relational Databases," Mar. 6, 1995, IEEE, pp. 271–278.

S. Gantimahapatruni and G. Karabatis, "Enforcing Data Dependencies in Cooperative Information Systems," May 12, 1993, IEEE, pp. 332–341.

IBM Technical Disclosure Bulletin, vol. 38, No. 01, Jan. 1995, Fast and Secure Stored Procedures for a Client/Server DBMS, pp. 79–82.

A. Alashqur and C. Thompson, "O–R Gateway: A System for Connecting C++ Application Programs and Relational Databases," Aug. 10, 1992, pp. 151–169.

R. Ahad and T. Cheng, Hewlett–Packard Journal 44 (1993) Jun., No. 3, "HP OpenODB: An Object–Oriented Database Management System for Commercial Applications," pp. 20–30.

TOPLink, "The Industry Standard for Persistence Product, A White Paper: The Object People", 1997. pp. 1–10.

IBM Technical Disclosure Bulletin, vol. 37, No. 08, Aug. 1994, "Automatically Revising Function Prototypes in C and C++ Implementations of System Object Model Classes," pp. 363–365.

C. Kleissner, "Enterprise Objects Framework, A Second Generation Object–Relational Enabler," Jun. 1995, pp. 455–459.

"The Enterprise Objects Framework," Jul. 1994, pp. 1–12.

SQL Tutorial: Introduction to Structured Query Language, Version 3.63 (May 1998), URL http://w3.one.net/~jhoffman/sqltut.htm#Compound Conditions pp. 1–21.

The JDBC Database Access API (Apr. 1998), URL http://java.sun.com/products/jdbc p. 1–9.

O'Brien, Stephen K., "Turbo Pascal 5.5: The Complete Reference", Osborne/McGraw–Hill (1989), pp. 500–522.

Gosling, Joy, and Steele, "The Java™ Language Specification", Addison–Wesley (1996), pp. 1–2.

Hamilton, Cattell, and Fisher, "JDBC Database Access with Java™", Addison–Wesley (1997), p. 1–2.

R.G.G. Cattell et al., "Object Database Standard: ODMG 2.0", Morgan Kaufmann Publishers, Inc. (1997), p. 1–2.

Campione, Mary and Kathy Walrath, "The Java™ Tutorial", Addison–Wesley 1998, p. 1–2.

* cited by examiner

METHOD AND APPARATUS FOR LOADING STORED PROCEDURES IN A DATABASE CORRESPONDING TO OBJECT-ORIENTED DATA DEPENDENCIES

RELATED APPLICATIONS

The following identified U.S. patent applications are relied upon and are incorporated by reference in their entirety this application.

Provisional U.S. Patent Application No. 60/068,415, entitled "System and Method for Mapping Between Objects and Databases", filed on Dec. 22, 1997.

U.S. pending patent application Ser. No. 09/106,186, entitled "Object Relational Mapping Tool That Processes Views", filed on the same date herewith.

U.S. pending patent application Ser. No. 09/106,189, entitled "Source Code Merging", filed on the same date herewith.

U.S. pending patent application Ser. No. 09/105,957, entitled "Integrating Both Modifications to an Object Model and Modifications to a Database into Source Code by an Object-Relational Mapping Tool", filed on the same date herewith.

U.S. pending patent application Ser. No. 09/106,210, entitled "Rule-Based Approach to Object-Relational Mapping Strategies", filed on the same date herewith.

U.S. pending patent application Ser. No. 09/106,212, entitled "User Interface for the Specification of Lock Groups", filed on the same date herewith.

U.S. pending patent application Ser. No. 09/106,119, entitled "A Fine-Grained Consistency Mechanism for Optimistic Concurrency Control Using Lock Groups", filed on the same date herewith.

U.S. pending patent application Ser. No. 09/106,211, entitled "User Interface for the Specification of Index Groups Over Classes", and filed on the same date herewith.

U.S. pending patent application Ser. No. 09/106,188, entitled "Method and Apparatus for Creating Indexes in a Relational Database Corresponding to Classes in an Object-Oriented Application", filed on the same date herewith.

U.S. pending patent application Ser. No. 09/106,046, entitled "An Integrated Graphical User Interface Method and Apparatus for Mapping Between Objects and Databases", filed on the same date herewith.

U.S. pending patent application Ser. No. 09/106,955, now abandoned entitled "Methods and Apparatus for Efficiently Splitting Query Execution Across Client and Server in an Object-Relational Mapping", filed on the same date herewith.

BACKGROUND OF THE INVENTION

1. Field of the Invention

This invention generally relates to database systems for computers and, more particularly, to an apparatus and methods for loading stored procedures in a database corresponding to object-oriented data dependencies.

2. Description of the Related Art

Conventional object-database mapping tools receive class definitions from an object-oriented application and automatically generate code, typically stored in a database schema, to create tables and other structures for the database. The tables and structures in the database are used to hold data corresponding to objects in an object-oriented application. Differences in object-oriented applications and databases make it difficult to develop these object-database mapping tools.

In an object-oriented application the skeleton of an object is a class. The class may have a number of fields used to store values or parameters typically used by object instances of the class. The class may also include specific methods which define how objects instantiated from each class will interact with each other and hold certain information in each of the corresponding fields. A hierarchical class structure provides an organized framework for creating objects and their relationships.

The database typically organizes data using one or more tables having multiple rows and columns. A data relationship is defined by the manner in which data is stored in the various rows and columns of the tables. A single table or multiple tables can be used to hold every row or record of data. A primary key includes one or more columns in a table that uniquely define each row of data. If multiple tables are used to store a data, a foreign key associates rows of data in one table with another table. Stored procedures are used in databases to manipulate tables of data. These stored procedures are small compiled programs written in a database language such as Structured Query Language (SQL) and stored in the database.

Database developers create stored procedures to save time performing routine database functions. Stored procedures can be combined to perform complex operations by having one stored procedure call another stored procedure. Generally, database developers understand the data dependencies related to the stored procedures because they are developing the customized code. Specifically, if one stored procedure calls a second stored procedure, the second stored procedures must be declared or defined before the first stored procedure can call or invoke it. Thus, the developer makes sure all stored procedures are defined in the stored procedure area of a database before they are called by another stored procedure. A failure to do this results either in a compilation error or run-time error because the database can not resolve references and the calling stored procedure can not locate the called stored procedure.

Loading stored procedures in proper order is more difficult when they are used to manipulate data in a database corresponding to objects in an object-oriented application. The loading order depends on the relationships between objects, hierarchical class structure, and the order stored procedures are called. For example, deleting a subclass object requires deleting corresponding entries for the superclass object stored in the database. Assume a disk drive object is a subclass of a part object superclass. To delete a disk drive object, a corresponding relationship must be deleted from the part object superclass. In the database, a stored procedure deletes the disk drive entry in a table and calls another stored procedure to delete the corresponding relationship in the part table of the database. The latter stored procedure must be loaded in the database before the former stored procedure can call and reference it.

To avoid the complexities associated with using stored procedures, conventional object-database mapping tools use Structured Query Language (SQL) and do not even attempt to tackle the complexities of using stored procedures. Unlike SQL, stored procedures are generally not portable and must be developed, compiled, and loaded for each different type of database. These conventional object-database mapping tools prefer to support SQL over stored procedures even though stored procedures are faster and have more powerful programming constructions.

As a result, the user must develop, compile, and load stored procedures manually into the database. The object-oriented user or programmer must have a detailed understanding of both object-oriented and database concepts to develop and use stored procedures. The user must also be familiar with techniques for compiling and loading these stored procedures for each different database. Overall, this deters users from gaining the higher performance offered by using stored procedures on the databases.

Based on the above limitations found in conventional database and object-oriented systems, it is desirable to have an object-database mapping tool load the stored procedures in a database corresponding to object-oriented data dependencies.

SUMMARY OF THE INVENTION

In accordance with methods and systems consistent with the present invention, an improved object-database mapping tool is provided that stores a series of stored procedures associated with a database and an object-oriented application. The tool accesses a plurality of stored procedures associated with a plurality of classes corresponding to an object-oriented application. The tool then determines a sequence of the stored procedures based on relationships between the classes. The tool loads the stored procedures based upon the sequence. In another aspect of the present invention, the tool uses several steps to sequence the stored procedures. The tool categorizes the stored procedures based on the classes they correspond to in the object-oriented application. The tool then loads the stored procedures corresponding to classes having relationships to other classes. Next, the tool loads the stored procedures corresponding to classes categorized as superclasses. The tool then loads the stored procedures corresponding to classes categorized as subclasses.

BRIEF DESCRIPTION OF THE DRAWINGS

The accompanying drawings, which are incorporated in and constitute a part of this specification, illustrate an implementation of the invention and, together with the description, serve to explain the principles of the invention.

In the drawings.

DETAILED DESCRIPTION

OVERVIEW

Figure 1:
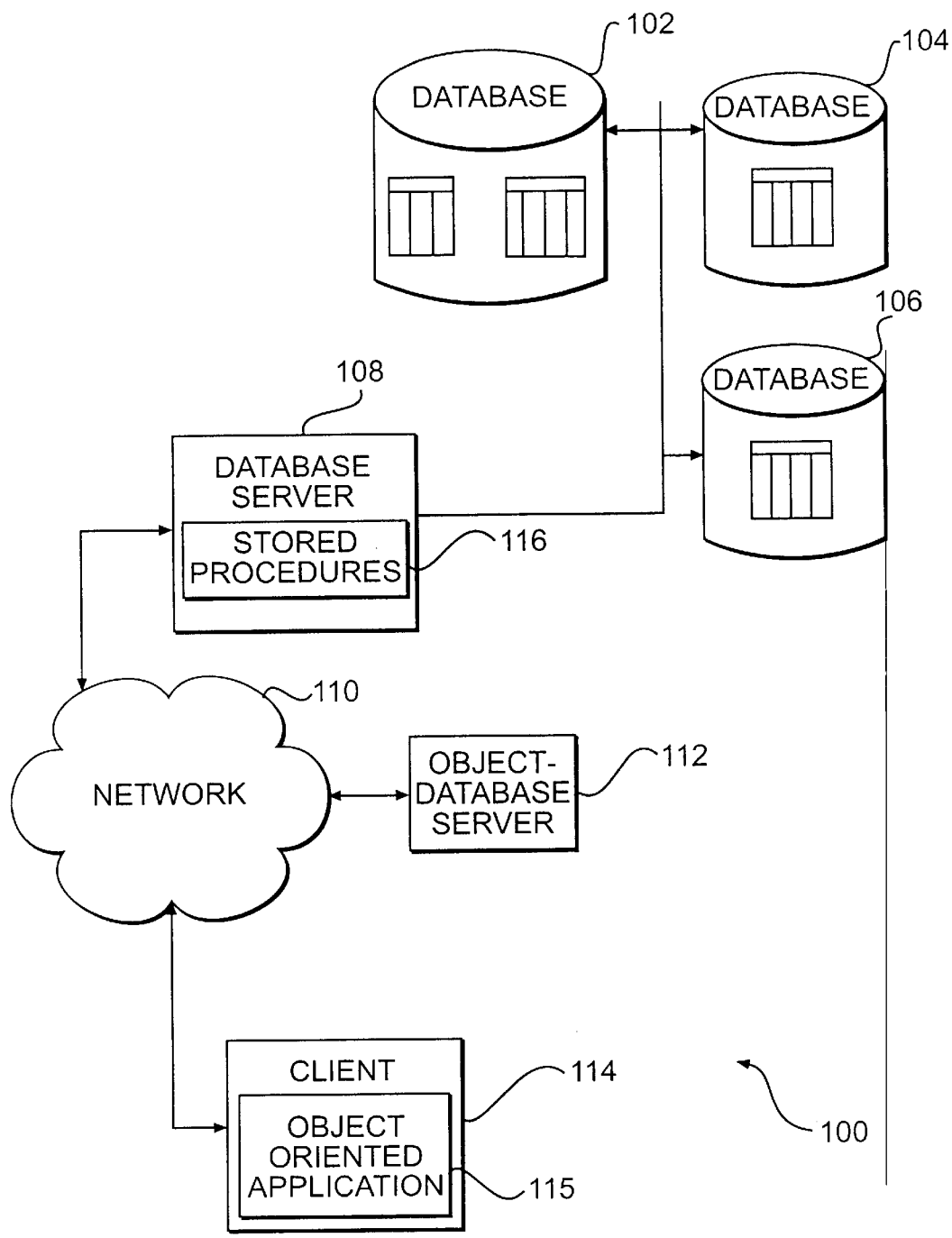
FIG. 1 is a block diagram of an enterprise system integrating object-oriented applications and a database.

Reference will now be made in detail to an implementation of the present invention as illustrated in the accompanying drawings. The same reference numbers will be used throughout the drawings in the following description to refer to the same or like parts.

Methods and systems designed in accordance of the present invention provide a method and system for loading stored procedures in a database based on data dependencies. Stored procedures in a database correspond to methods used in an object-oriented application. An object-oriented application accesses the data in the tables of a database corresponding to an object in the object-oriented application.

Methods and systems consistent with the present invention simplify loading stored procedures in a database. An object-database mapping tool is typically used to generate the appropriate stored procedures, tables, and other data structures in the database from an object-oriented application. In one implementation, the tool loads the stored procedures in the database. This increases a users software development efficiency because the user can focus on object-oriented development rather than loading stored procedures in a database.

ENTERPRISE SYSTEM

Systems and methods consistent with the present invention utilize a client-server environment where a client communicates with a server over a common networking protocol such as TCP/IP. These systems and methods utilize a relational database management system (RDBMS) with networking features to facilitate client-server distributed database processing techniques. Such a RDBMS, for example, receives requests from a remote computer and provides results over a network. The RDBMS also includes standard software development interfaces such as Structured Query Language (SQL), stored procedures, and a variety of concurrency control mechanisms. Data is stored in the RDBMS in a series of tables having rows and columns. The tables can be linked together through relationships in one or more columns. The terms database or relational-database are used herein to refer to a RDBMS or another type of database management system consistent with the principle of the present invention.

SQL is a standardized database language for accessing relational databases. ANSI X3H2 is the standards organization responsible for maintaining the SQL standards. Database system vendors typically include extensions and additions to the SQL standard.

Stored procedures allow users to develop software routines that manipulate tables and data in a database. Typically, stored procedures are compiled and stored in the database when the database is created. A user may indirectly invoke these stored procedures in an object-oriented application by adding, deleting, and operating on objects. The stored procedures are used to access and modify tables of data in the database corresponding to the operations performed on the objects.

Concurrency mechanisms in the database include locks and other mutual exclusion techniques to give each user a consistent view of the database. These locks and other concurrency mechanisms allow multiple users or programs to simultaneously share the same database and information. An object-oriented application indirectly uses these locks when accessing data corresponding to objects stored in the database. The locks make sure the database is consistent with the operations and modifications made when multiple applications are accessing the same objects or related objects.

FIG. 1 is a block diagram of an enterprise system 100 integrating object-oriented applications and a database. Enterprise system 100 includes databases 102, 104, 106 and a network 110 connecting an object-database server 112, a database server 108, and a client 114. Network 110 can be a combination of networks including the Internet, corporate intranets, and other networks compatible with a networking protocol such as TCP/IP. Within database server 108, are stored procedures 116 generated consistent with systems and methods of the present invention.

Databases 102, 104 and 106 include database tables corresponding to classes used in an object-oriented application. Classes associated with a database are considered "persistence-capable" classes. The objects representing these persistence-classes can be either persistent objects or transient objects depending how they are instantiated. If an object is a persistent instance of a persistent-capable class, the object is stored in the database and is accessible to many different applications. Alternatively, if an object is a transient instance of a persistence-capable class, the object exists only while the application which instantiated the object is executing.

Object-database server 112 provides a conduit between a relational database connected to database server 108 and object-oriented applications, such as an object-oriented application 115 on client 114. In general, object-oriented applications that access persistent objects send requests written in an object-oriented language over network 110 to object-database server 112. Object-server database 112 translates the object-oriented requests to the appropriate database instructions and sends the instructions over network 110 to database server 108 for further database processing. Object-database server 112 may also provide a response back to the object-oriented application if results are generated during the database operation. Database server 108 provides database services to object-database server 112 and client 114. Database server 108 accesses data stored on databases 102, 104, and 106 in response to database instructions from object-database server 112. Alternatively, object-database server 112 and database server 108 may be on the same computer system or in different parts of a network other than those areas discussed above.

Figure 2:
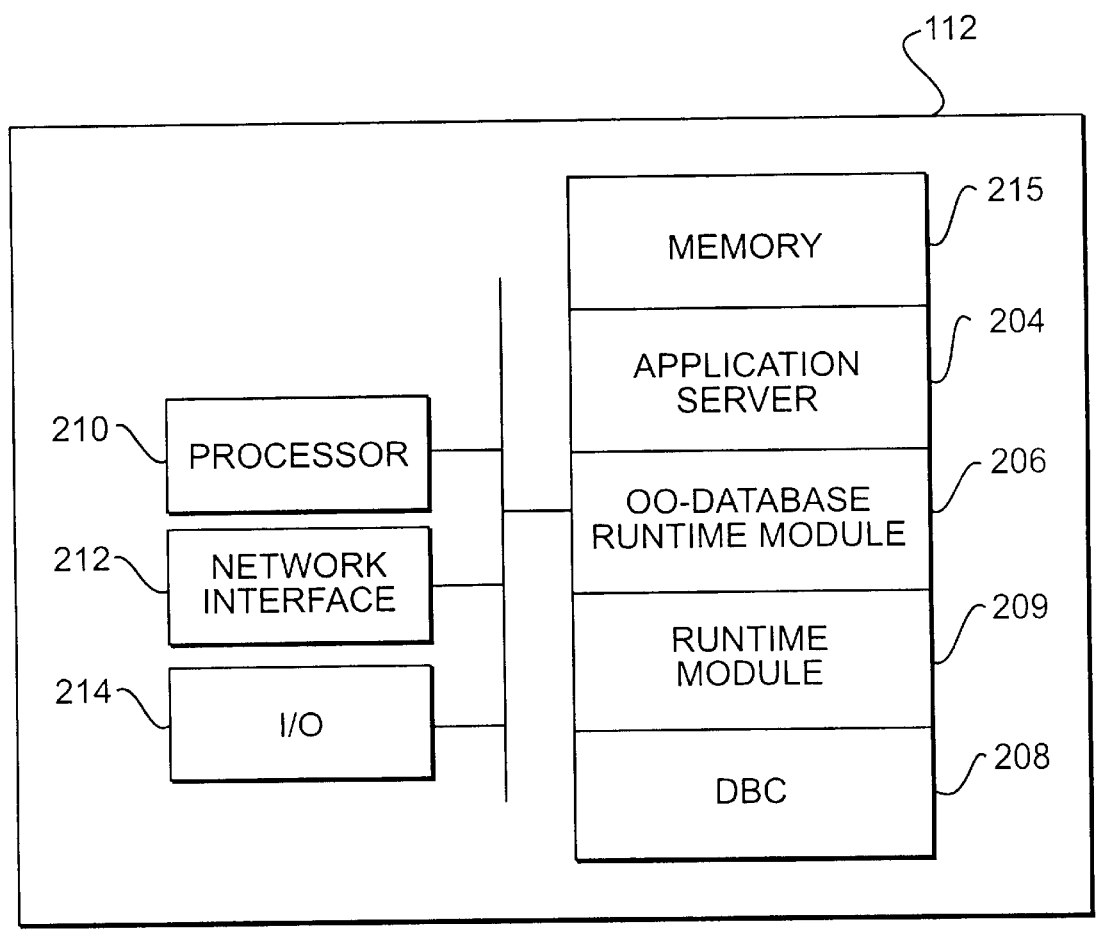
FIG. 2 is a block diagram of the subsystems associated with object-database server.

FIG. 2 is a block diagram of the subsystems associated with object-database server 112. Object-database server 112 includes a processor 210, a network interface 212, an input/output subsystem (I/O) 214, and a memory 215. Processor 210 executes instructions associated with applications contained in memory 215 and transmits information over an interconnect to other subsystems in object-database server 112. I/O 214 is an interface used to couple object-database server 112 with devices such as a keyboard, a mouse, a display device, and any other I/O device useful in operating and managing object-database server 112.

Memory 215 includes an application server 204, an object-oriented database runtime module 206, a runtime module 209 and a database connectivity (DBC) module 208. Application server 204 stored in memory 215 receives requests to access objects stored on databases 102, 104, and 106. Server 112 receives these database requests over network 116 from client 114 executing object-oriented application 115. These requests typically involve manipulating tables of information stored in one or more databases associated with database server 108. Object-oriented database runtime module 206 converts the object-oriented requests into database commands.

Object-oriented database runtime module 206 receives object-oriented instructions, such as bytecodes compatible with the Java™ programming language, to access data stored in a database. Runtime environment 209 process the object-oriented instructions for execution on processor 210. Runtime environment 209 may include a virtual machine (VM) and corresponding development kit (DK) having object oriented class libraries. Some instructions may be interpreted by aVM and executed on processor 210. A VM simulates a processor and executes on many different hardware platforms. In one implementation, runtime environment 209 is the Java Runtime Environment having a Java™ virtual machine (JVM) and the Java™ Foundation Classes (JFC) as the development kit (DK). The Java™ Virtual Machine (JVM) is one virtual machine that promotes platform independent computing using the Java™ programming language.

Other database related instructions may use database connectivity module DBC 208 to connect object-oriented database runtime module 206 with database information. DBC 208 provides an application programming interface (API) for programmers to access a database. For example, the JDBC™ database connectivity module is one type of DBC 208 that provides an interface between Java™ applications and a database. JDBC™ database connectivity module is a Java™ application program interface (API) for executing structured query language (SQL) statements. It consists of a set of classes and interfaces written in the Java™ programming language. It provides a standard API for tool/database developers and makes it possible to write database applications using a pure Java API. JDBC is described in greater detail in Hamilton, Cattell, and Fisher, *JDBC Database Access with Java™*, Addison-Wesley (1997), which is incorporated herein by reference. For example, DBC 208 can be used to establish a logical connection with a database, send SQL statements to the database, and process the results provided from the database. (Sun, Sun Microsystems, the Sun logo, Java™, JDBC™, and Java™-based trademarks are trademarks or registered trademarks of Sun Microsystems, Inc. in the United States and other countries.)

Figure 3:
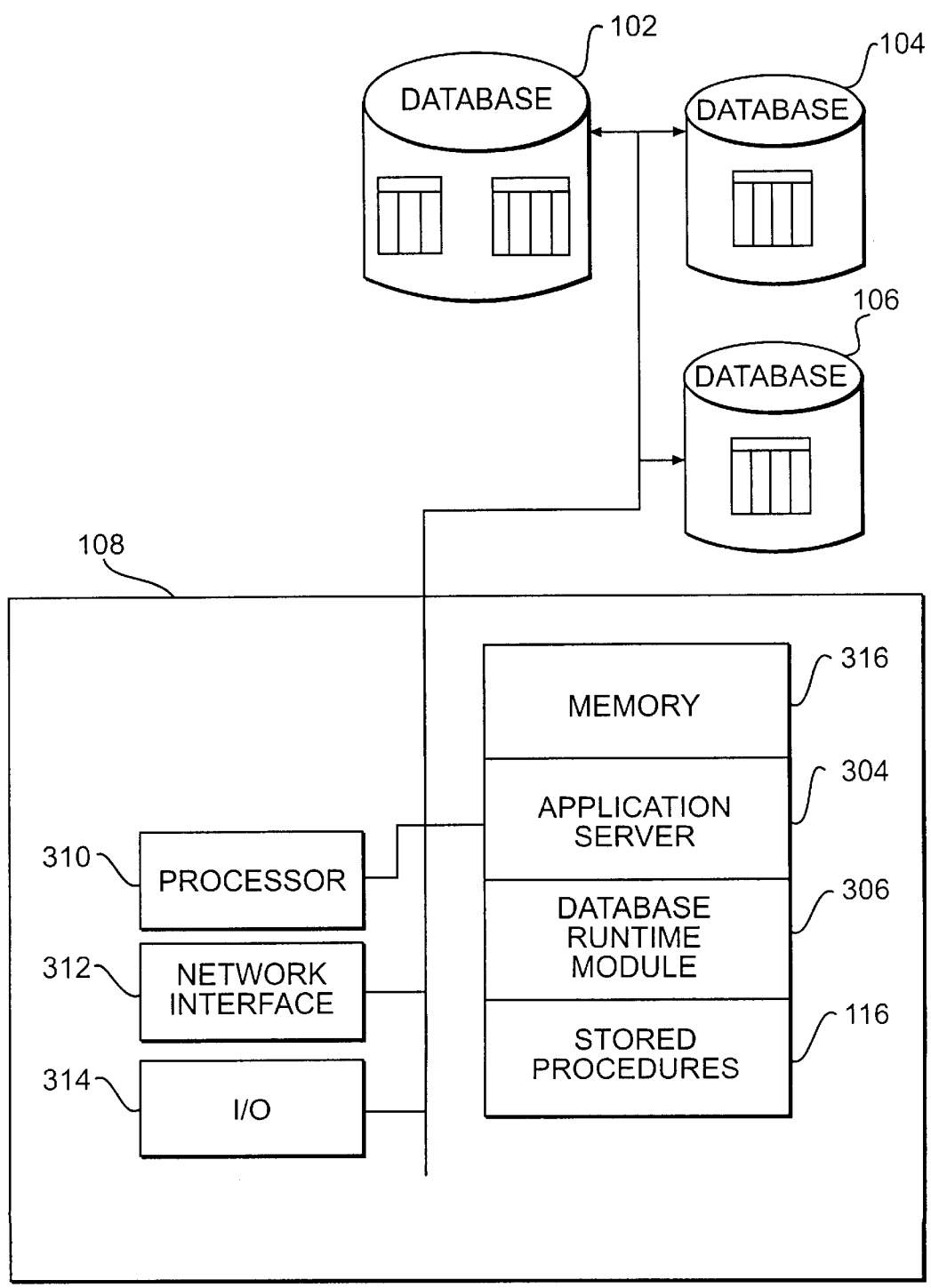
FIG. 3 is a block diagram illustrating the subsystems associated with database server.

FIG. 3 is a block diagram illustrating the subsystems associated with database server 108. Database server 108 includes a processor 310, a network interface 312, I/O 314, and a memory 316. Processor 310 executes instructions associated with applications contained in memory 316 and transmits results to other subsystems in database server 108 over a high speed interconnect or bus. I/O 314 is an interface used to couple database server 108 with devices such as a keyboard, a mouse, a display device, and any other I/O device useful in operating and managing database server 108.

Memory 316 includes an application server 304 and a database runtime module 306, and stored procedures 116. Application server 304 stored in memory 316 fulfills requests for database access to databases 102, 104, and 106. The database requests are received over network 110 from object-database server 112 in a database language such as SQL. Database runtime module 306 processes the database requests and accesses data in databases 102, 104, and 106.

Figure 4:
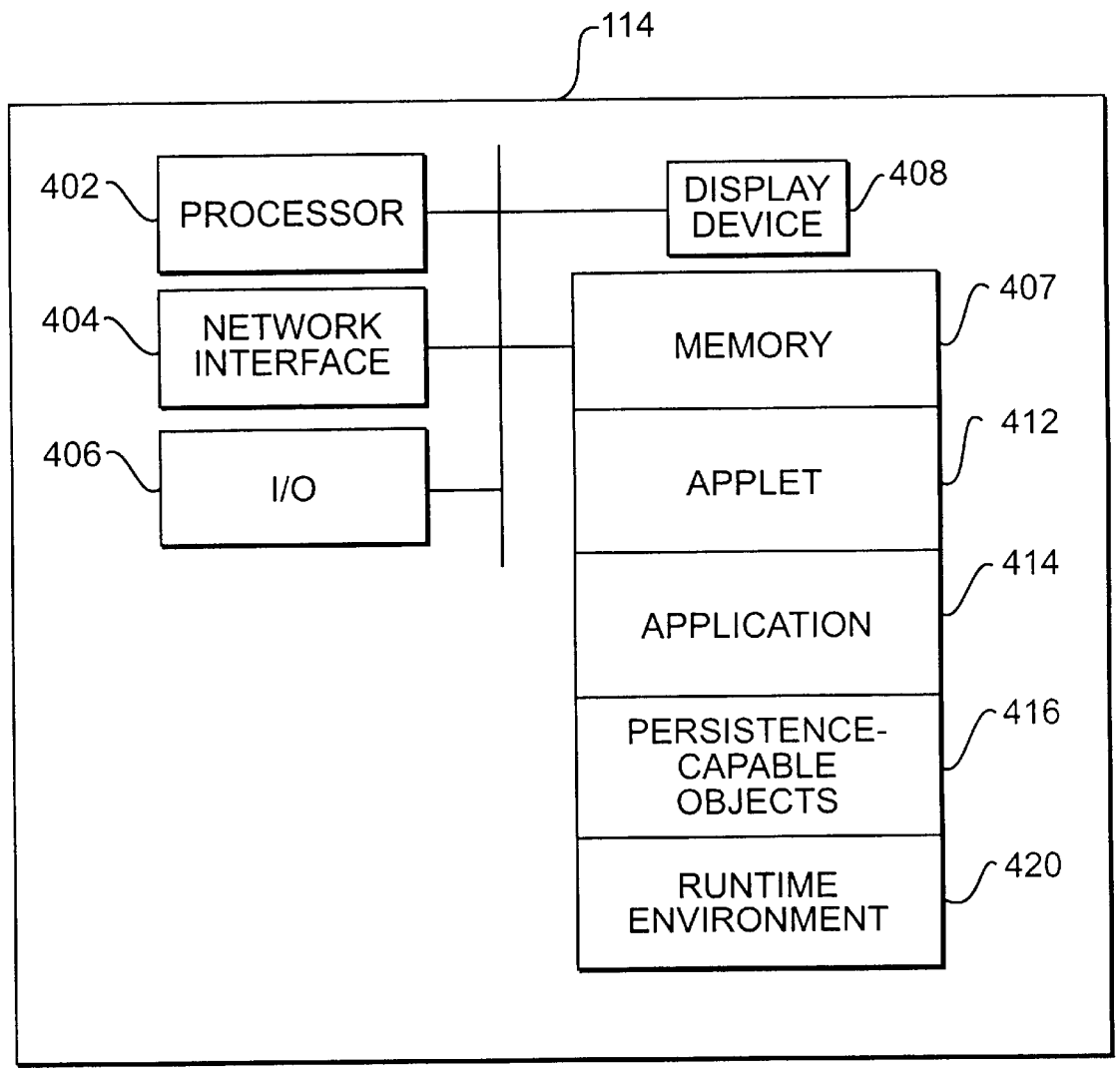
FIG. 4 is a block diagram illustrating the subsystems associated with a client used to access objects stored on a database.

FIG. 4 is a block diagram illustrating the subsystems associated with client 114 used to access objects stored in a database. Client 114 includes a processor 402, a network interface 404 coupled to network 110, an I/O interface 406, a display device 408, and a memory 407 loaded with a number of different software subsystems. These elements operate in a manner similar to the like named elements mentioned above. Display device 408 provides visual feedback to the user making requests to manipulate objects stored in databases 102, 104, and 106. Also, a user can use display device 408 to display and interact with a GUI object-database mapping tool consistent with the present invention.

Memory 407 includes an applet 412, an application 414, one or more persistence-capable objects 416, and runtime environment 420. Runtime environment 420 may include a virtual machine (VM) and a development kit (DK) having class libraries. In one implementation consistent with the present invention, applet 412 includes object-oriented code that accesses tables in a database. Alternatively, application 414 may also use object-oriented code to access tables in a database. Either applet 412 or application 414 generates persistence-capable objects 416. Applet 412 and application 414 may be developed using the Java™ programming language and processed in a Java™ runtime environment (JRE) having a Java™ virtual machine (JVM) and classes from the Java™ Foundation Classes (JFC).

Figure 5:
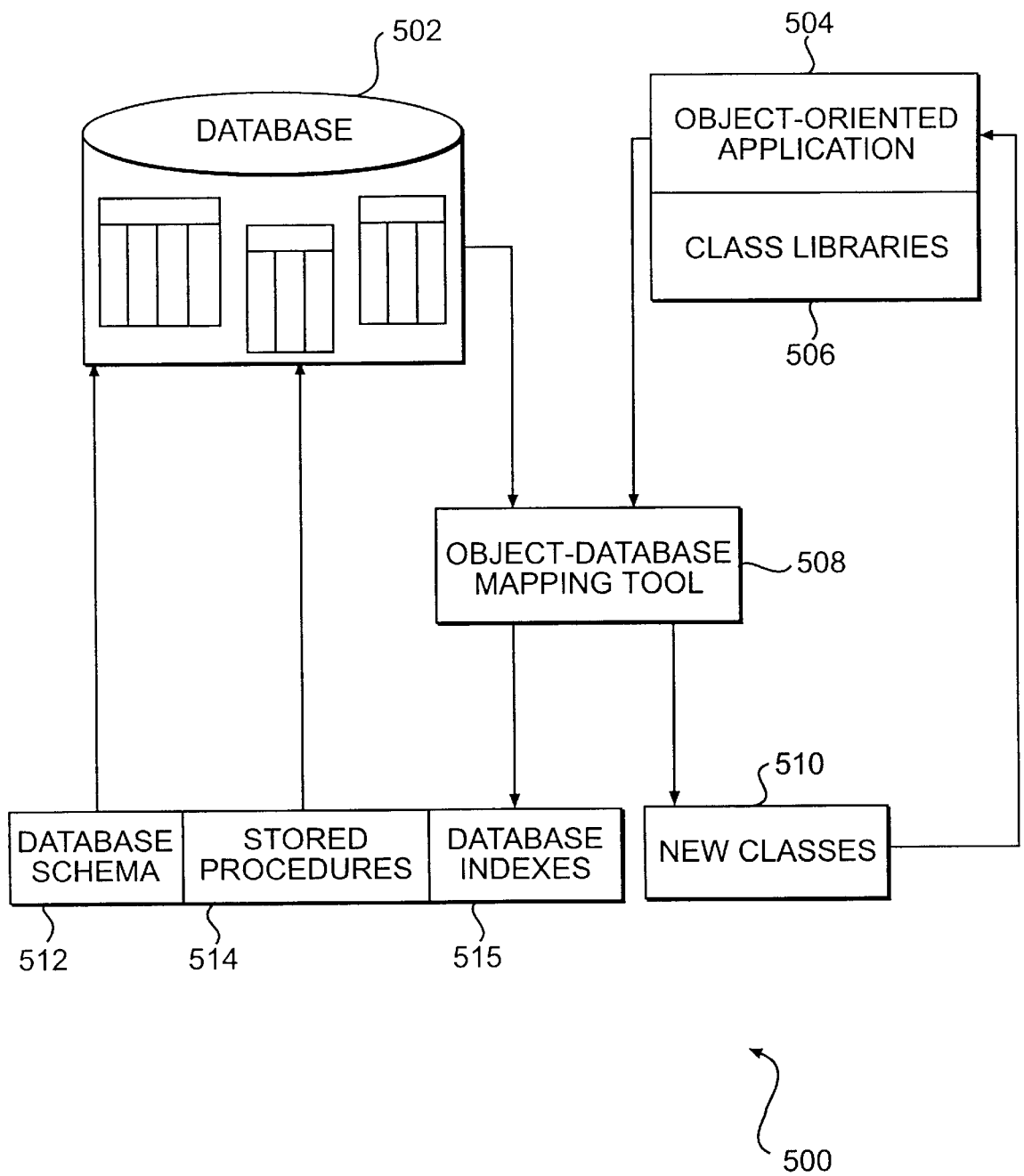
FIG. 5 is a block diagram of an exemplary object-oriented-database system with which systems and methods consistent with the present invention may be implemented.

FIG. 5 is a block diagram of an exemplary object-oriented database system 500 with which systems and methods consistent with the present invention may be implemented. System 500 includes a database 502 having tables to store data associated with objects, an object-oriented application 504, one or more class libraries 506 used to instantiate an object, an object-database mapping tool 508, a database schema 512, stored procedures 514, indexes 515, and numerous new classes 510 generated using object-database mapping tool 508.

In one implementation consistent with the present invention, object-database mapping tool 508, maps tables contained in database 502 into classes. A user provides tool 508 with data stored in tables of database 502. Tool 508 converts the tables into a number of corresponding new classes 510. In one implementation consistent with the present invention, these new classes 510 are integrated with existing class libraries 506.

Tool 508 can also map classes in class libraries 506 into the tables used in database 502. A user provides tool 508 with persistence-capable-compatible classes in class library 506 for mapping to database 502. Object-mapping tool 508 determines how each persistence-capable class in class library 506 is mapped to tables in database 502. During the class-to-database mapping, stored procedures 514, and database indexes 515 are generated and stored in database 502. Database indexes 515 are used to improve access time associated with accessing data associated with objects and stored in database 502. The class-to-database mapping process generates database schema 512 containing code and instructions for generating database tables.

CLASS-TO-TABLE MAPPING

Figure 6:
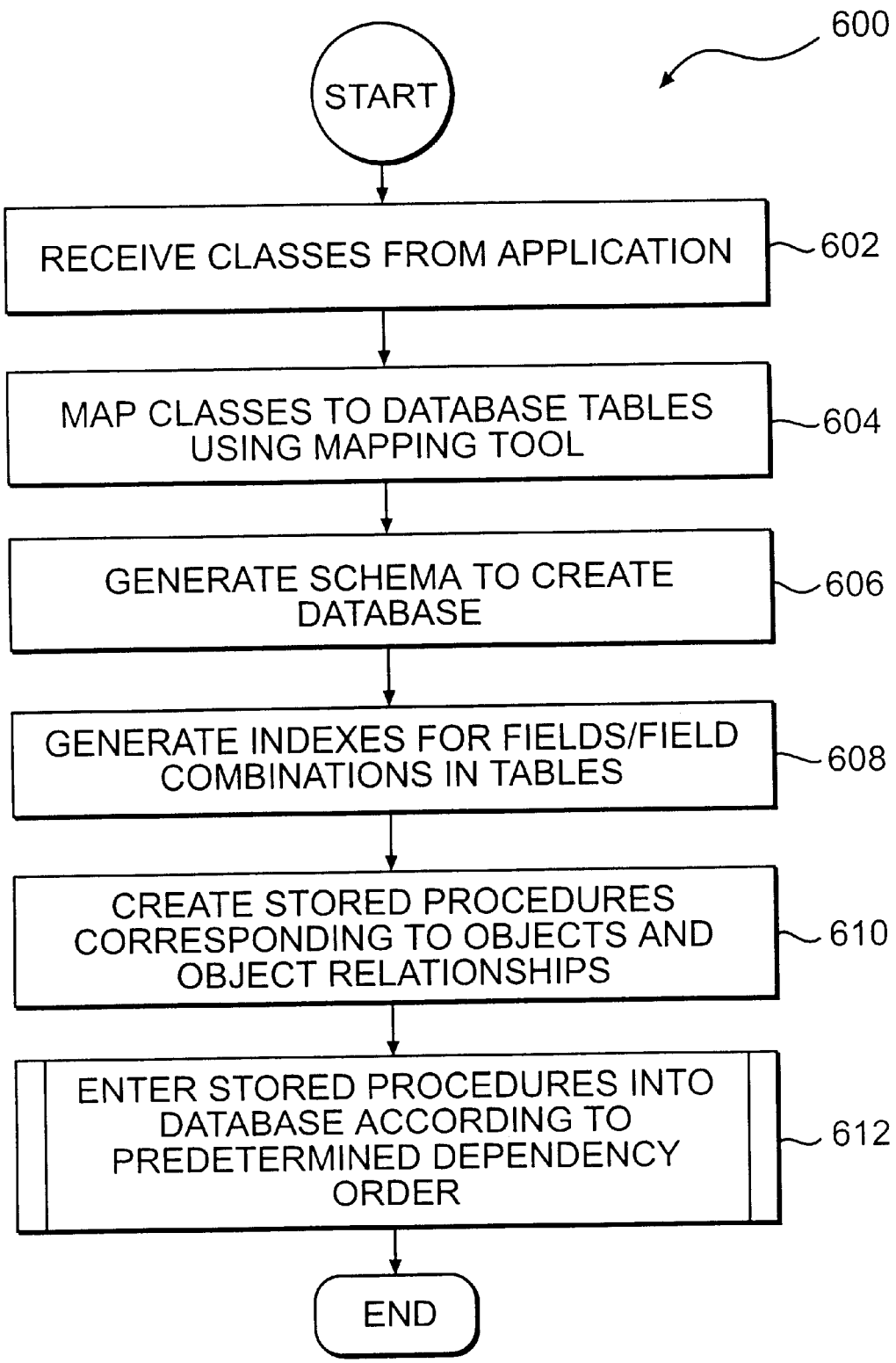
FIG. 6 is a flowchart of a method consistent with the present invention used to translate a class in an object-oriented application to table entries in a database.

FIG. 6 is a flowchart of a method consistent with the present invention used to translate a class in an object-oriented application to table entries in a database. The user begins by providing tool 508 one or more classes corresponding to the objects in an object-oriented application (state 602). These classes have fields, methods, and other operators associated with an object-oriented language. Fields in this context are used to store different types of data or variables and methods are used to manipulate the objects derived from the corresponding classes.

A class hierarchy is also provided in the various classes defined in the object-oriented application. The class hierarchy indicates which classes are superclasses and which classes are subclasses of each other. Methods, fields and other object-oriented characteristics from a superclass are inherited by a subclass. These relationships are used to map classes into database tables and other database structures.

Tool 508 creates tables in the database having rows and columns corresponding to the one or more classes. The tables are created based upon a predetermined class-to-database mapping between classes and tables. In one implementation consistent with the present invention, the class-to-database mapping maps one class in the object-oriented application to one table in the database (state 604). Using the one-to-one class-to-database mapping technique, a class having multiple field entries is mapped to a single table wherein each column corresponds to each of the multiple fields. An additional row is added to the table for each object instance of the class stored in the database. Alternatively, more complex class-to-database mappings can be used to map classes to tables such as mapping a single class to multiple tables or mapping multiple classes to a single table.

Tool 508 generates a schema to create the tables in a database (state 606). A schema includes a description of the tables in a database and their various attributes. A user uses the schema to generate a database. Multiple schemas can be organized as separate entries in a catalogue. The catalogue names each schema with a unique label to distinguish the schemas from each other.

To improve look-up speed and performance, tool 508 allows a user to specify which fields in an object should be indexed in the database for fast access. The fields specified by the user are logically organized by tool 508 in an index group. Tool 508 analyzes each field in the index group specified by the user and generates indexes on tables in the database corresponding to the selected fields (state 608). The index is a data structure that allows rows of tables to be found quickly based on the values of one or more entries in a row. The database selects the best index to improve a query when multiple indexes are defined on the table.

In one implementation consistent with the present invention, tool 508 allows a user to specify if the index group is to be unique or can be non-unique. If a unique index group is specified, tool 508 generates one or more unique indexes for the user. A unique index requires that each row in the table contains a unique value in the specified column. Unique indices are typically faster because only one row entry in the table matches a search.

In contrast, a non-unique index group of fields selected by the user may correspond to one or more non-unique indexes in the database. By selecting a non-unique index group, tool 508 can generate non-unique indexes in the database if necessary. In contrast to the unique indexes, the non-unique indexes can contain duplicate value entries in the corresponding columns. Typically, the non-unique indexes are slower when the database has to distinguish between two or more rows with common column entries.

Tool 508 also creates one or more stored procedures 514 corresponding to operations typically performed on objects in the object-oriented application (state 610). Tool 508 automatically creates stored procedure 514 to provide basic operations useful for retrieving data stored in the database. For example, stored procedures can be generated to perform routine operations on objects such as Add, Delete, Modify and Retrieve data entries in the database.

Stored procedures 514 are entered into the database in a predetermined dependency order. If a first stored procedure calls a second stored procedure, the second stored procedure must be defined first in the database. The dependency order ensures that a stored procedure is defined in the database before it is called by an application or other stored procedure. In one implementation consistent with the present invention, the order the stored procedures are stored in the database depends on the class hierarchy and the relationships between stored procedures (state 612).

Figure 7:
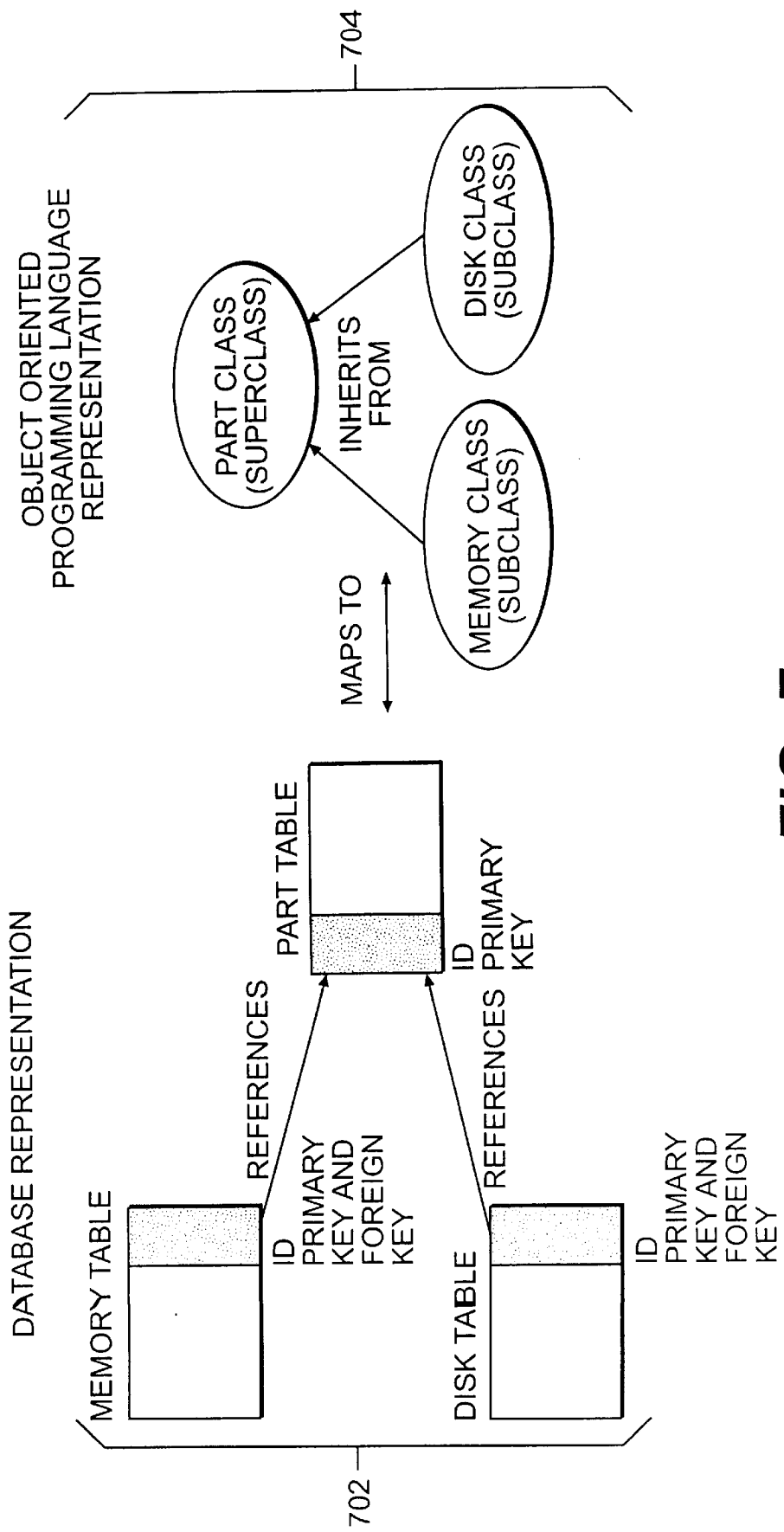
FIG. 7 is a block diagram showing a one-to-one table and one-to-one object relationship.

FIG. 7 is a block diagram showing how object relationships are mapped to table relationships in a database. A superclass-subclass object relationship 704 is modeled in the database using foreign keys and primary keys as indicated in a corresponding superclass-subclass table relationship 702. In this example, assume an object-oriented application has a set of classes including a part class, a memory class and a disk class. The memory and disk classes are subclasses of the part class as shown in superclass-subclass object relationship 704. Because the memory and disk classes are subclasses they inherit methods, fields, and, interfaces of the part class. The memory and disk classes also may extend the parts class to define certain unique aspects of the memory and disks classes.

To represent the superclass-subclass class relationship 704, the database uses a superclass-subclass table relationship 702. Essentially, a first table is a subclass of a second table by specifying that the primary key of the first table is also a foreign key that references the primary key of the second table. In this case, the first table stores each instance of the disk class and contains a column having a primary key that is also a foreign key to the primary key in the part table. Likewise, the table used to store each instance of the memory class contains a column having a primary key that is also a foreign key to the primary key in the part table. These tables maintain referential integrity in the database when objects are added or deleted. For example, if a part object is deleted, the superclass-subclass table relationship 702 requires that entries in the memory table and disk table are deleted as well.

Figure 8:
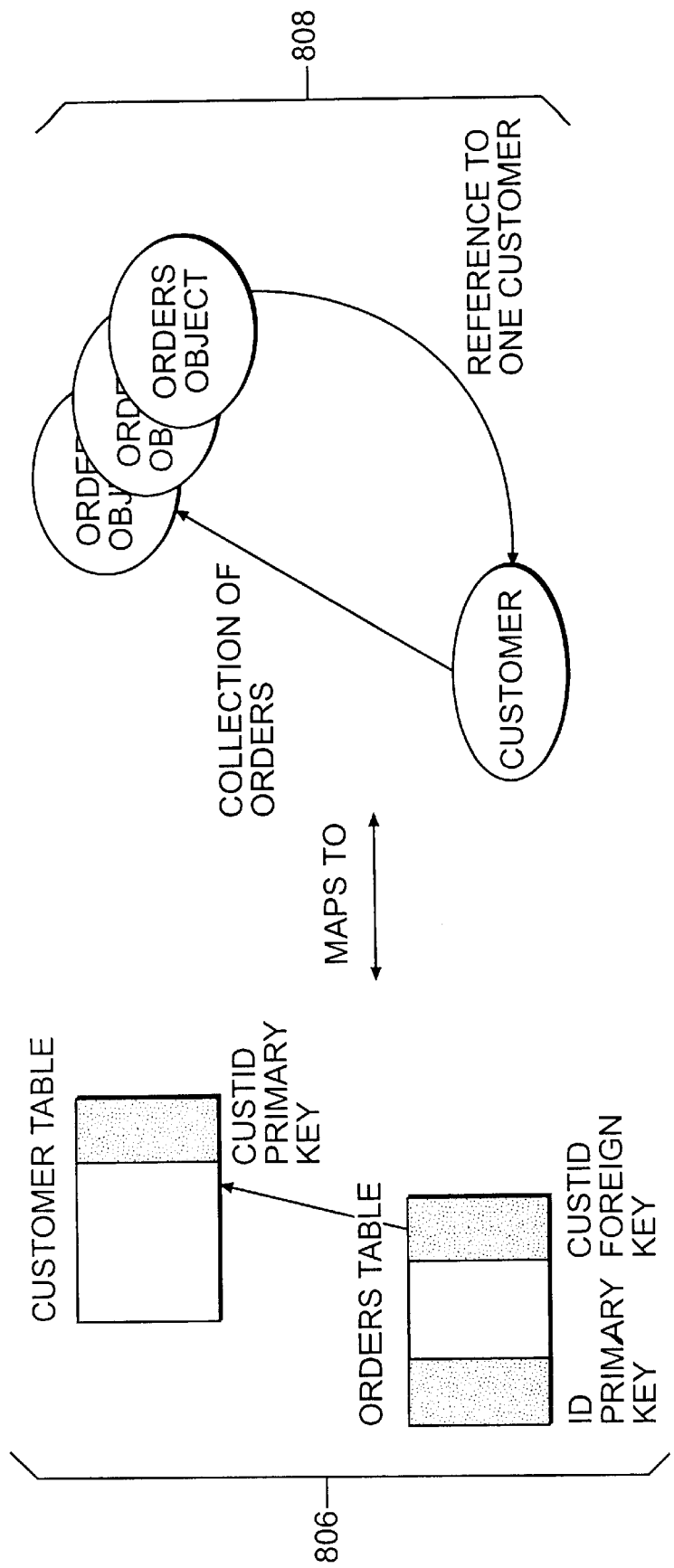
FIG. 8 is a block diagram showing a one-to-many table and one-to-many object relationship.

In addition to preserving class hierarchy, foreign keys and primary keys can also be used represent the one-to-many relationships between classes. FIG. 8 illustrates a one-to-many class relationship 808 and a one-to-many table relationship 806. For example, one-to-many class relationships 808 allows a customer object to have many order objects but each order object can only be associated with one customer object. The customer class in one-to-many class relationship 808 has a field in the class that references multiple order objects. Each order object has a field that contains a single reference to a particular customer object.

The corresponding one-to-many table relationship 806 includes an orders table having a customer identification (CUSTID) primary key column entry and a separate CUSTID foreign key column. The customer table includes a CUSTID primary key which is unique for each customer in the system. This mechanism ensures referential integrity in the object representation in the database. A deletion of a customer from the database also requires a deletion of that customer's corresponding orders in the order table based upon the CUSTID foreign key. However, deleting an order from the order table does not require a deletion of the corresponding customer from the customer table.

Figure 9:
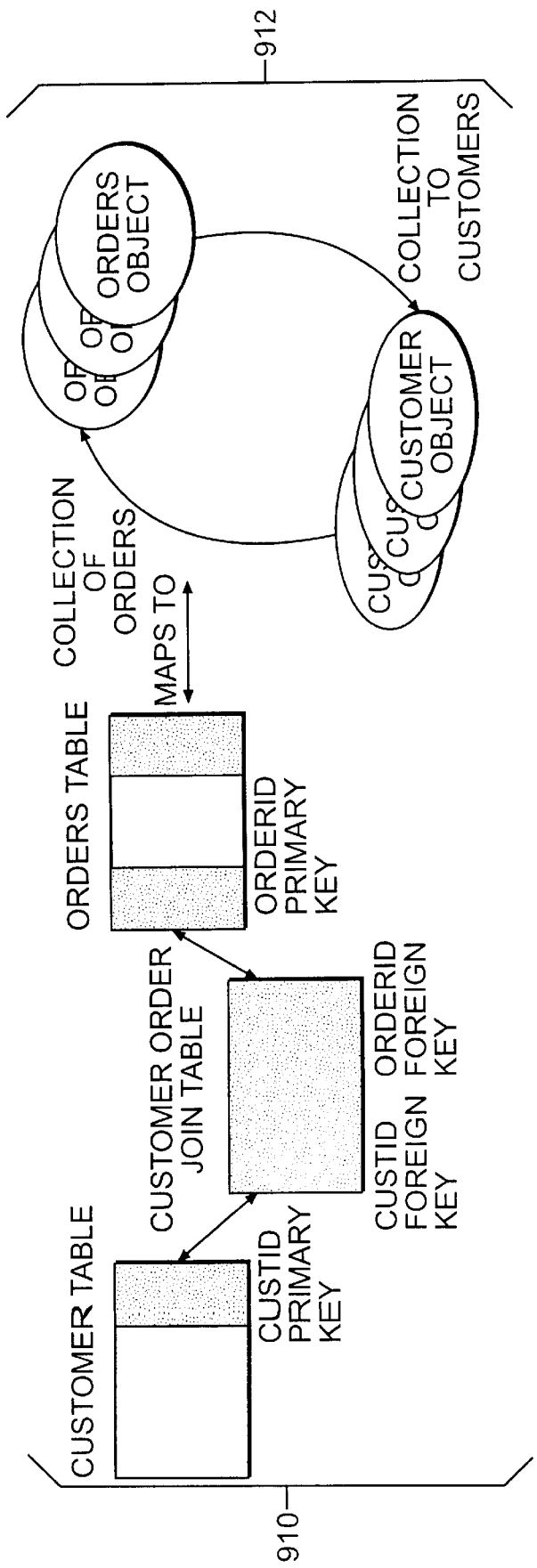
FIG. 9 is a block diagram showing a many-to-many table and many-to-many object relationship.

FIG. 9 illustrates how foreign keys and primary keys are used to represent a many-to-many class relationship 912 and many-to-many table relationship 910. Assume a customer object can reference multiple order objects and orders can be from multiple customers. The many-to-many class relationship 912 is represented in the database using a join table as shown with many-to-many table relationship 910. The join table is an intermediary table that is used to form the association between the entities in the two tables. A join table generally has two sets of columns. One set of columns forms a foreign key reference to the primary key in one table. The other set of columns forms the foreign key reference to the primary key in the other table. In this example, a customer order join table has a CUSTID foreign key mapped to a CUSTID primary key in a customer table and an ORDERID foreign key mapped to an ORDERID primary key in an orders table respectively.

TABLE-TO-CLASS MAPPING

Figure 10:
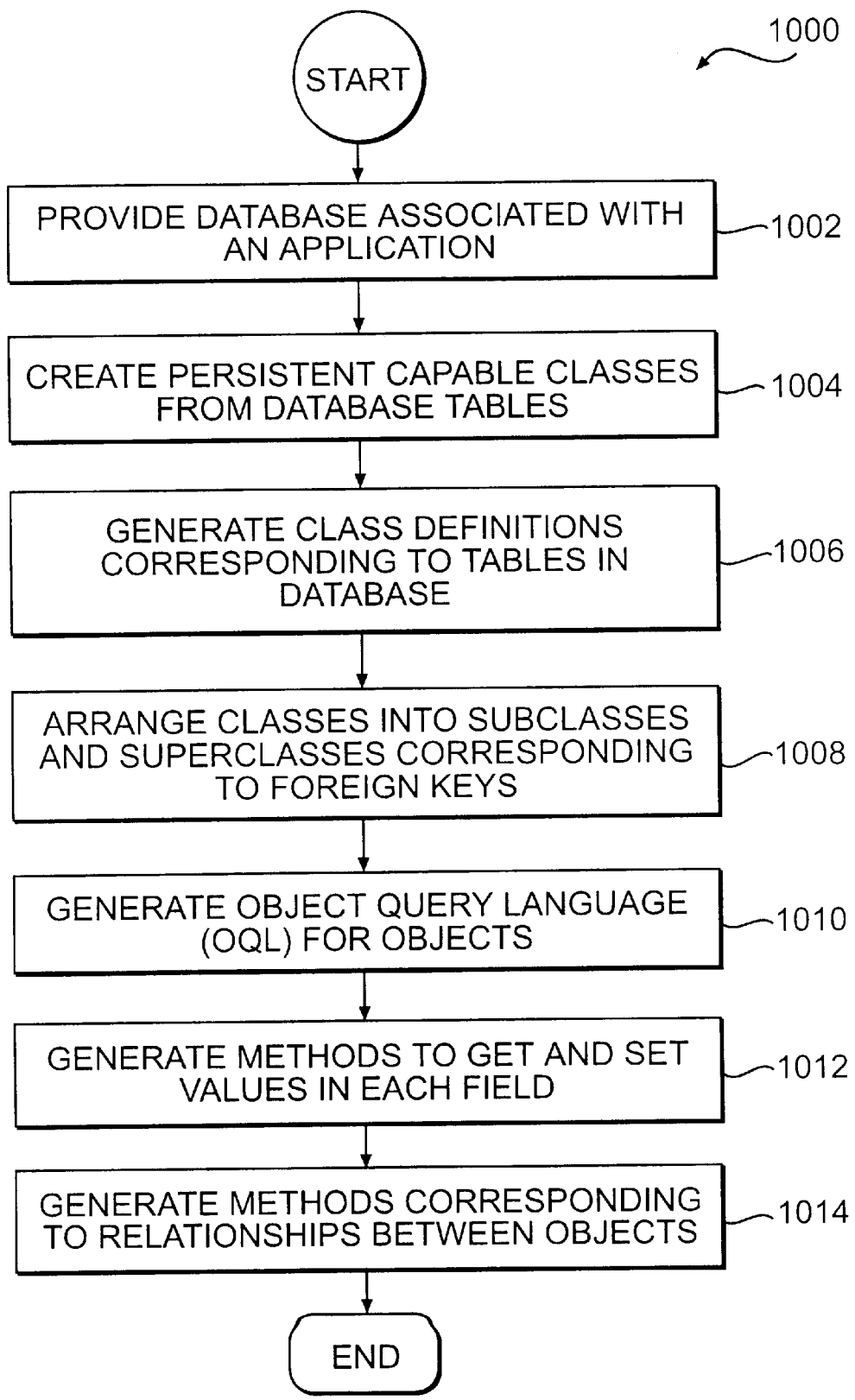
FIG. 10 is a flowchart of a method consistent with the present invention used to convert tables and other information in a database into classes in an object-oriented application.

Tool 508 also includes a table-to-class mapping method to transform tables in a database to one or more classes in an object-oriented language. FIG. 10 is a flowchart of the steps used to convert tables and other information in a database into classes in an object-oriented application. Initially, the user provides the database, and any other useful information such as stored procedures, indexes, and SQL routines related to the database, to tool 508 (state 1002). Tool 508 uses the mapping process to create persistence-capable classes from tables in the database (state 1004). In one implementation, tables in the database correspond to persistence-capable classes capable of storing objects after applications referencing the objects have completed executing.

Tool 508 generates class definitions corresponding to each table in the database (state 1006). Tool 508 analyzes relationships between tables to determine if there is a superclass-subclass relationship between tables, a one-to-many relationship between tables, or a many-to-many relationship between tables. FIGS. 7–9 outlines database table relationships and how they translate into corresponding class relationships in an object-oriented application.

A table-to-class mapping technique used to convert a table into a class is the inverse process of the class-to-table mapping technique discussed above. Tool 508 arranges the classes into the appropriate superclass and subclasses based on how foreign keys and primary keys are used in a table (state 1008). Essentially, a subclass is generated from a table that contains a column that has both the primary key for the subclass table and also a foreign key to a superclass table. For example, in FIG. 7 a superclass-subclass table relationship 702 includes a disk table having a column entry which is a primary key in the disk table column as well as a foreign key to a part table. In this example, the disk table is considered a subclass of the part class.

With respect to indexes, tool 508 uses the existing indexes in the original database and does not create more indexes unless the user specifically requests them in the table-to-class mapping.

Tool 508 also generates object query language (OQL) routines for use by objects generated from a particular classes (state 1010). The OQL routines allow a user to query objects using an object-oriented programming language interface. The OQL routines understand the relationships between classes and can do referential navigation without requiring the user to make explicit databases operations. For example, a query on a particular class will return all objects in that class as a connection of objects which match the query criteria. Users can then iterate through the collection of objects and operate on the individual objects. Alternative methods other than OQL may also be used to access objects in the database.

Tool 508 also generates default methods to operate on each field in a class (state 1012). A "get" method is created to get a field value stored in a persistent object in the tables of a database. Similarly, a "set" method is used to set a value in each field of a persistent object also stored in the database. These methods enable a user to utilize methods in an object-oriented programming language to manipulate field values in persistent objects. Alternative implementations can include different default methods as necessary for the particular application or set of applications being developed.

Tool 508 may also generate object-oriented methods corresponding to other stored procedures located in the database (state 1014). These object-oriented methods enable an object-oriented application to access precompiled stored procedure routines stored in the database.

DEPENDENCY BASED STORED PROCEDURE GENERATION

Figure 11:
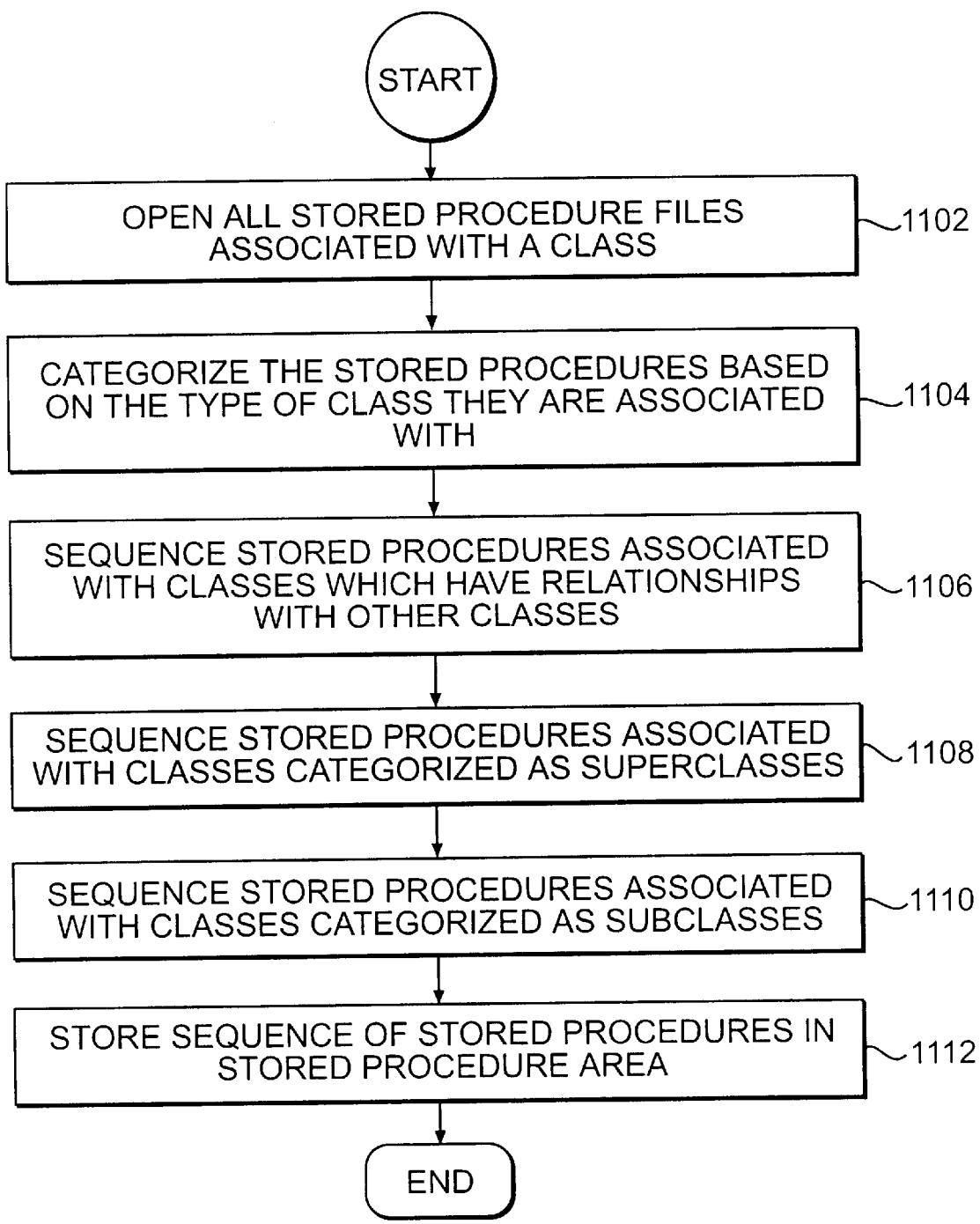
FIG. 11 is a flowchart of a method consistent with the present invention that loads a series of stored procedures in a database for access by an object-oriented application.

FIG. 11 is a flowchart providing the method steps associated with loading stored procedures in a database corresponding to object-oriented data dependencies. Implementations of the present invention use the class hierarchy and relationships between objects to determine the order in which stored procedures are loaded into the database. This technique prevents compilation errors from occurring because a stored procedure is loaded in the database before it is called by another stored procedure.

In systems and methods consistent with the present invention, tool 508 generates the sequence for loading these procedures when the user maps classes in an object-oriented application to the tables in a database. Tool 508 also generally creates stored procedures useful in manipulating data stored in the database and associated with each class. These stored procedures include, for example, procedures for adding, deleting, and accessing the data stored in the database.

In FIG. 11, tool 508 generates stored procedures associated with one or more classes in an object-oriented application. These stored procedures are stored in a set of files in a filesystem. Tool 508 opens stored procedure files associated with a class (state 1102). Typically, tool 508 processes persistent-capable classes because an object instance from a persistent-capable class can be stored in a database.

Tool 508 sequences the stored procedures based on the classes they are associated with in the object-oriented application (state 1104). As illustrated in FIGS. 7–9, classes may be related in a superclass-subclass class relationship 704, a one-to-many class relationship 808, or a many-to-many class relationship 912.

The first stored procedure in the sequence correspond to a relationship between classes (state 1106). A relationship between two classes can be established using a foreign key between the classes. For example, a stored procedure may exist to delete a Customer-Order relationship where a foreign key associates a customer with a particular order. Generally, a stored procedure that only deletes a relationship does not depend on other stored procedures. In alternative cases where a stored procedure for deleting a relationship also deletes an object, the stored procedure for deleting the relationship is loaded in the database after the stored procedure for deleting the object.

Tool 508 then places the stored procedures associated with classes categorized as superclasses next in the sequence (state 1108). These stored procedures are next in the sequence so they can be referenced by one or more subclasses. This is important when a subclass object is deleted because the stored procedure used to delete data corresponding to the subclass objects must also call one or more stored procedures to update the tables storing data associated with the corresponding superclass. This maintains referential integrity among the objects when they are stored in the database.

After the superclasses, tool 508 places stored procedures associated with classes categorized as subclasses in the sequence (state 1110). Those skilled in the art understand that a class may be a superclass to one class and a subclass to another class depending on the class hierarchy.

Once the stored procedures are placed in the proper sequence, the tool creates a final stored procedure area associated with the database and capable of holding the stored procedures (state 1112). This stored procedure area is accessible by an object-oriented application accessing the database and can be in an area located on a remote server connected to the network. Tool 508 loads the stored procedures in the database using the final stored procedure area.

Figure 12:
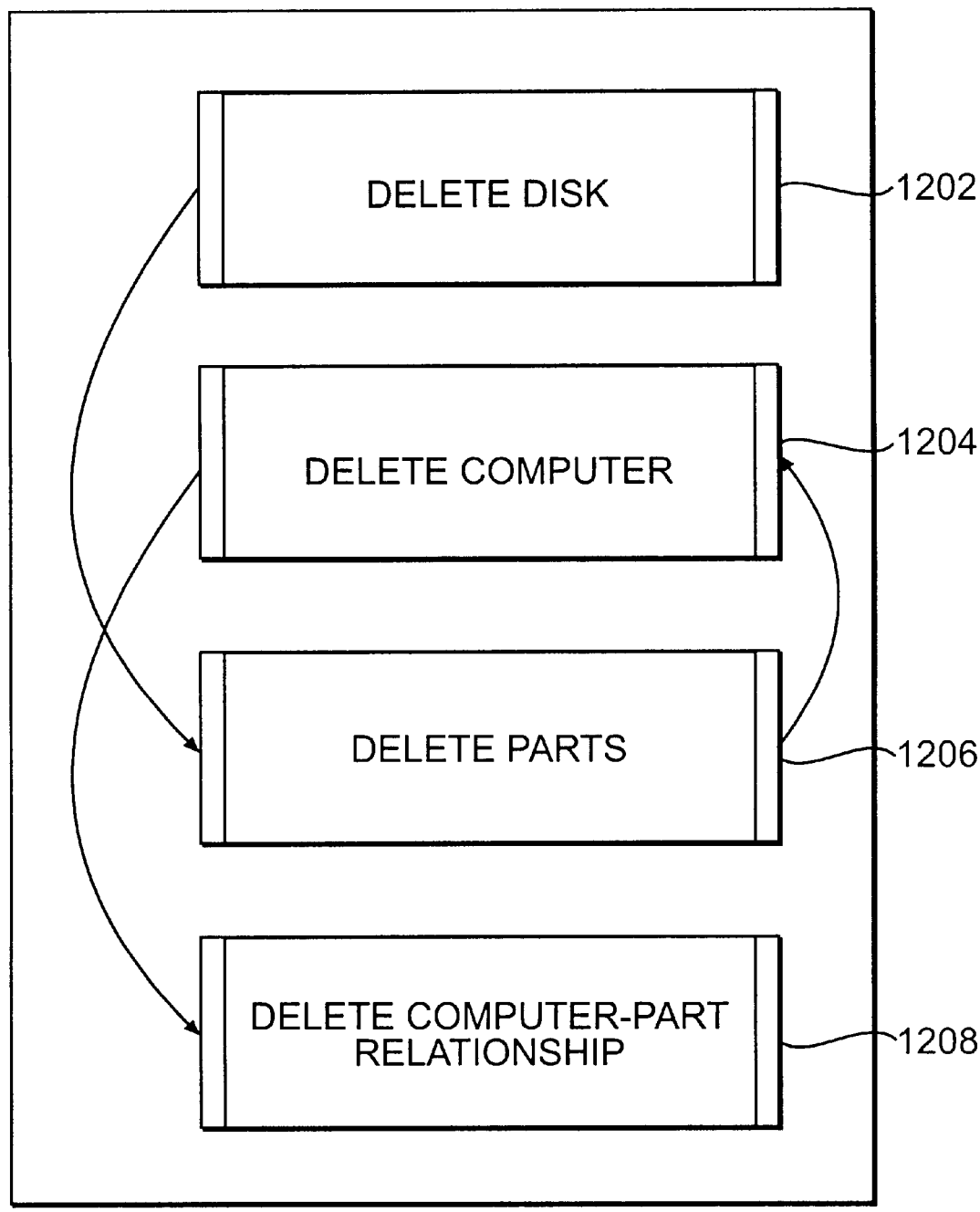
FIG. 12 is a block diagram of a series of stored procedures in an initial sequence.
Figure 13:
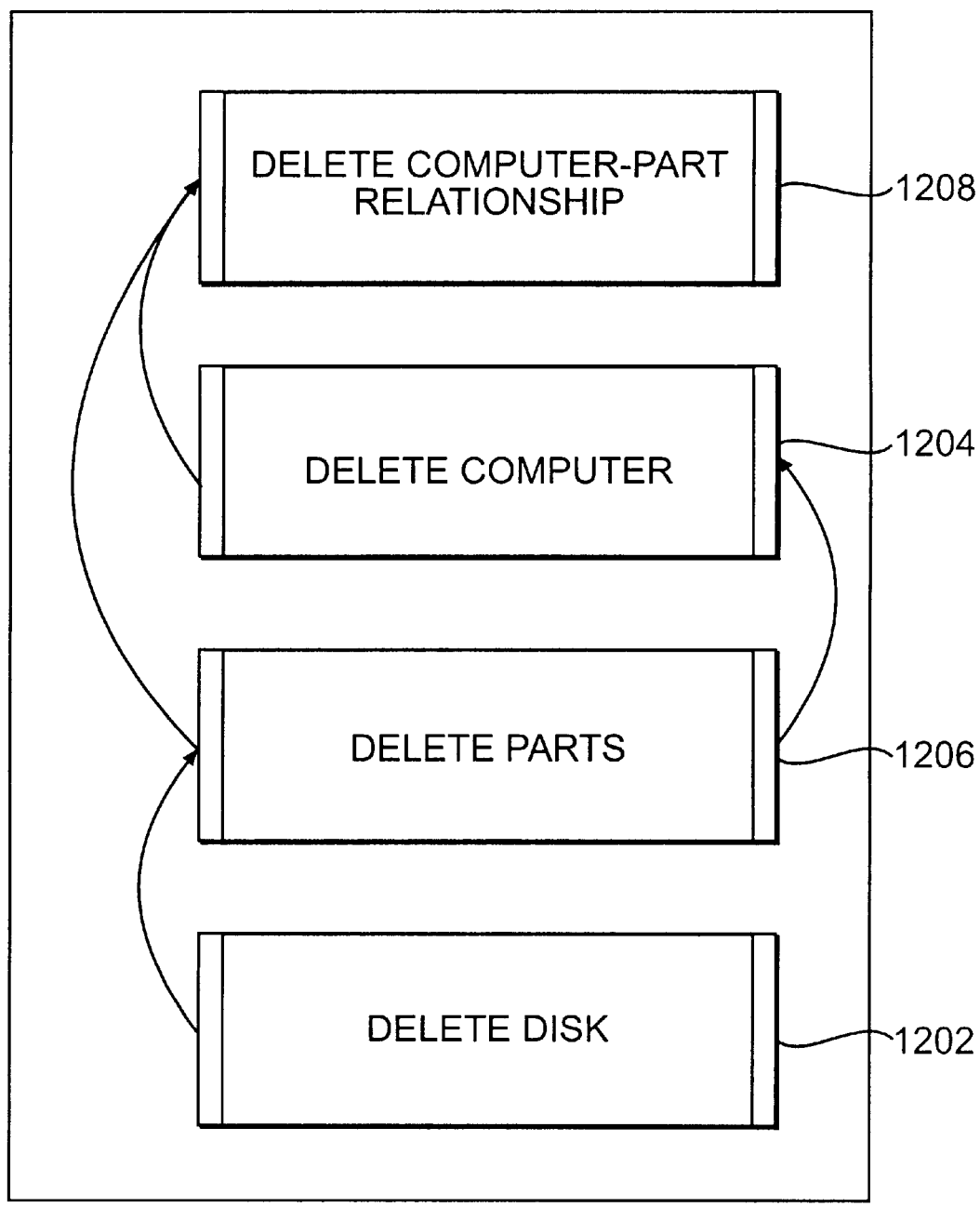
FIG. 13 is a block diagram of a series of stored procedures placed in proper sequence using one implementation consistent with the present invention.

FIG. 12 and FIG. 13 illustrate an example of a series of stored procedures loaded in a database in a manner consistent with present invention. FIG. 12 is a block diagram of a series of stored procedures generated by a conventional object-mapping tool. Typically, the stored procedures are generated on a per class basis and are not in the proper sequence for loading in the database.

For example, tool 508 may generate an initial sequence of stored procedures including Delete Disk 1202, Delete Computer 1204, Delete Part 1206, and Delete computer-part relationship 1208. The arrows indicate relationships between the stored procedures. Delete Disk 1202 calls DeleteParts 1206, Delete Computer 1204 calls Delete Computer-Part Relationship 1208, DeleteParts 1206 calls Delete Computer 1204, and DeleteParts 1206 also calls Delete Computer-Part Relationship 1208. In this example, disks are a subclass of parts and there is a one-to-many relationship between parts and a computer. Accordingly, Delete Computer-Part Relationship 1208 reflects the relationship between parts and computers. If these stored procedures are loaded in this initial sequence numerous reference errors would occur and the stored procedures would not operate properly.

Systems and method consistent with the present invention load the stored procedures in the proper sequence based upon class relationships and class hierarchy. FIG. 13 is a block diagram of a series of stored procedures generated in a manner consistent with present invention. Tool 508 places Delete Computer-Part Relationship 1208 first in the sequence since it does not call other stored procedures. Next, tool 508 places Delete Computer 1204 in the sequence since it relates to operating on a one-to-many relationship with the other classes. DeleteParts 1206 is the next stored procedure in the sequence because it relates to operating on a superclass and Delete Disk 1202 is next in the sequence because it relates to operating on a subclass of the classes. Loading the stored procedures in this sequence facilitates each stored procedure to be successfully compiled because the stored procedures are defined before they are referenced by another stored procedure.

While specific implementations have been described herein for purposes of illustration, various modifications may be made without departing from the spirit and scope of the invention. Those skilled in the art understand that the present invention can be implemented in a wide variety of software platforms and is not limited to the Java™ object oriented programming language and development environment. Furthermore, although aspects of the present invention are described as being stored in memory and other storage mediums, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Substantially similar implementations consistent with the present invention can be created except that the various software and hardware subsystems are contained in a single computer and not distributed over a network as described and illustrated above. Accordingly, the invention is not limited to the above described embodiments, but instead is defined by the appended claims in light of their full scope of equivalents.

What is claimed is:

1. A method, executed on a processor, for loading stored procedures associated with a database, the method comprising:
   accessing stored procedures associated with a plurality of classes corresponding to an object-oriented application;
   determining a loading sequence of the stored procedures based on relationships between the classes; and
   loading the stored procedures based upon the loading sequence.

2. The method of claim 1 wherein the loading further comprises:
   allocating a final stored procedure area in the database capable of holding the sequence of stored procedures and accessible by the object-oriented application; and
   loading the stored procedures in the final stored procedure area.

3. The method of claim 1 wherein determining the sequence of the stored procedures further comprises:
   categorizing the stored procedures based on the classes the stored procedures correspond to in the object-oriented application.

4. The method of claim 1 wherein loading the stored procedures further comprises:
   loading the stored procedures corresponding to classes having relationships to other classes.

5. The method of claim 1 wherein loading the stored procedures further comprises:
   loading the stored procedures corresponding to classes categorized as superclasses.

6. The method of claim 1 wherein loading the stored procedures further comprises:
   loading the stored procedures corresponding to classes categorized as subclasses.

7. A system for loading stored procedures comprising:
   a database having a plurality of stored procedures;
   a processor configured to access a plurality of stored procedures associated with a plurality of classes corresponding to an object-oriented application, determine a loading sequence of the stored procedures based on relationships between the classes, and load the stored procedures based upon the loading sequence.

8. The system in claim 7, wherein the processor loads the stored procedure and is further configured to create a final stored procedure area in the database capable of holding the sequence of stored procedures and accessible by the object-oriented application, and load the stored procedures in the final stored procedure area.

9. The system in claim 7, wherein the processor determines the sequence of the stored procedures and is further configured to categorize the stored procedures based on the classes the stored procedures correspond to in the object-oriented application.

10. The system in claim 7, wherein the processor loads the stored procedures and is further configured to load the stored procedures corresponding to classes having relationships to other classes.

11. The system in claim 7, wherein the processor loads the stored procedures and is further configured to load the stored procedures corresponding to classes categorized as superclasses.

12. The system in claim 7, wherein the processor loads the stored procedures and is further configured to load the stored procedures corresponding to classes categorized as subclasses.

13. An apparatus configured to load stored procedures associated with a database, comprising:
   means for accessing a plurality of stored procedures associated with a plurality of classes corresponding to an object-oriented application;
   means for determining a loading sequence of the stored procedures based on relationships between the classes; and
   means for loading the stored procedures based upon the loading sequence.

14. A computer program product capable of configuring a data processor to load stored procedures associated with a database, the computer program product comprising program code to cause the data processor to perform:
   accessing a plurality of stored procedures associated with a plurality of classes corresponding to an object-oriented application;
   determining a loading sequence of the stored procedures based on relationships between the classes; and
   loading the stored procedures based upon the loading sequence.

15. The computer program product in claim 14 wherein loading further comprises:
   creating a final stored procedure area in the database capable of holding the sequence of stored procedures and accessible by the object-oriented application; and
   loading the stored procedures in the final stored procedure area.

16. The computer program product in claim 14 wherein determining a loading sequence of the stored procedures further comprises:
   categorizing the stored procedures based on the classes the stored procedures correspond to in the object-oriented application.

17. The computer program product in claim 14 wherein determining the sequence of the stored procedures further comprises:
   loading the stored procedures corresponding to classes having relationships to other classes.

18. The computer program product in claim 14 wherein loading the stored procedures further comprises:
   loading the stored procedures corresponding to classes categorized as superclasses.

19. The computer program product in claim 14 wherein loading the stored procedures further comprises:
   loading the stored procedures corresponding to classes categorized as subclasses.

* * * * *

UNITED STATES PATENT AND TRADEMARK OFFICE
CERTIFICATE OF CORRECTION

PATENT NO. : 6,243,709 B1
DATED : June 5, 2001
INVENTOR(S) : Tony Chun Tung Ng et al.

Page 1 of 1

It is certified that error appears in the above-identified patent and that said Letters Patent is hereby corrected as shown below:

<u>Title page,</u>
Item [75], in the Inventor, after "Tung", insert -- Ng --.

Signed and Sealed this

First Day of January, 2002

*Attest:*

*Attesting Officer*

JAMES E. ROGAN
*Director of the United States Patent and Trademark Office*